Patented Sept. 19, 1922.

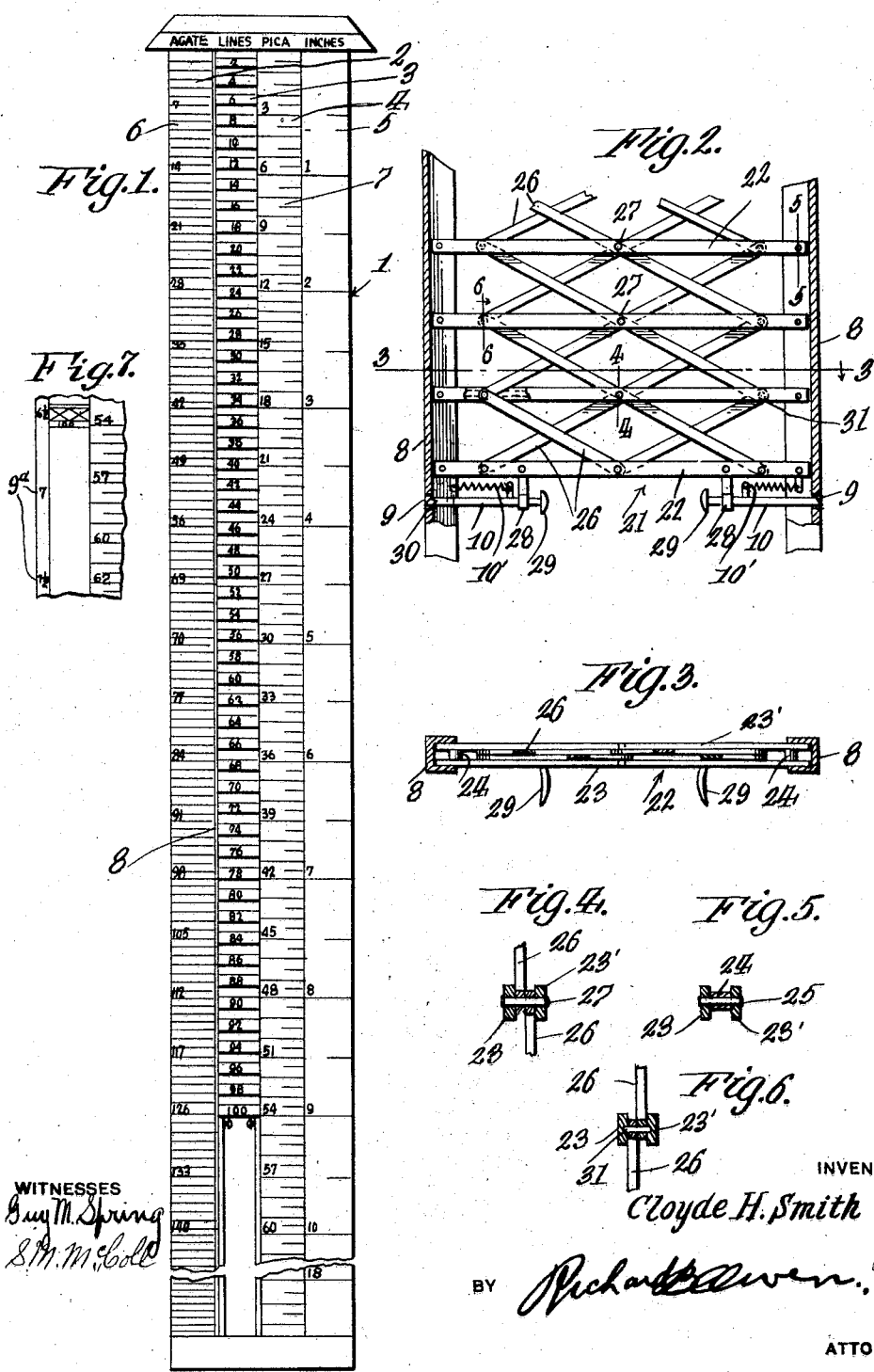

1,429,785

UNITED STATES PATENT OFFICE.

CLOYDE H. SMITH, OF NORTH ADAMS, MASSACHUSETTS, ASSIGNOR OF ONE-HALF TO GEORGE M. MATZET, NOW BY JUDICIAL CHANGE OF NAME GEORGE MICHAEL MALTON, OF BROOKLYN, NEW YORK.

SELF-ADJUSTABLE LINE GAUGE.

Application filed September 12, 1917. Serial No. 191,088.

*To all whom it may concern:*

Be it known that I, CLOYDE H. SMITH, a citizen of the United States, residing at North Adams, in the county of Berkshire and State of Massachusetts, have invented certain new and useful Improvements in Self-Adjustable Line Gauges, of which the following is a specification.

This invention relates to line gauges, and more particularly to self-adjustable gauges of this type.

The object of the invention is to provide a simple and efficient gauge of this character so constructed that a person having knowledge of the space in which it is desired to print certain matter may by the use of this gauge determine in a few seconds the number of lines of type of a certain kind which will be required to fill said space.
The main object of the invention is to provide a gauge of the class described which insures speed and accuracy in determining the number of lines of type of a certain kind which will be required to fill a space, the dimensions in inches of which is known and which fact may be ascertained without any calculating on the part of the operator.

In this age of high efficiency, the saving of time is of great value to every printing office, more especially those large newspapers which are required to make mails at certain times, and it is especially to meet requirements of such offices that this invention is designed, although obviously it may be used by any operator at any time.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a front elevation of this improved gauge with parts broken out.
Fig. 2 is an enlarged detail front elevation of a portion of the collapsible and expansible frame or shuttle used in connection with this device for determining the number of lines of type required to fill certain spaces.

Fig. 3 is a transverse section taken on the line 3—3 of Fig. 2,

Fig. 4 is a detail section taken on line 4—4 of Fig. 2,

Fig. 5 is a similar view taken on line 5—5 of Fig. 2, and

Fig. 6 is a similar view taken on line 6—6 of Fig. 2.

Figure 7 is an enlarged fragmentary view of the second column shown in Figure 1.

In the embodiment illustrated, the gauge constituting this invention comprises a strip or plate 1 of metal or other suitable material, which may be of any desired or suitable length, being preferably made of double-plate steel twenty inches long, and on which are arranged a plurality of columns, four being here shown, and numbered 2, 3, 4 and 5, respectively.

Column numbered 2, which is the first column at the left of the strip as shown in Fig. 1, is what may be termed the "agate column" and which contains markings in the form of lines 6 extending transversely of the column, fourteen agate lines being contained in an inch. In column numbered 3, is mounted a lazytong, self-adjustable gauge member or shuttle, part of which is shown in Fig. 2 on an enlarged scale, the word "Lines" only being here shown at the head of this column.

The third column, numbered 4, may be termed the "standard pica and nonpareil column" or "standard point printer's measure" in which there are seventy-two points or six picas to the inch, and two nonpareils to the pica. This column is provided with a plurality of transversely extending lines 7, six of which are contained in one standard inch, or approximately so, and each of which indicates the height of a pica, the short lines 7ª indicating the nonpareil, there being twelve nonpareils to an inch.

The fourth column numbered 5, and which is arranged adjacent the right side edge of plate 1 contains graduations indicating inches and fractions thereof.

The second column numbered 3 is provided with guides 8 along its side edges, which guides are here shown in the form of angle irons, the forwardly projecting flanges thereof being provided at predetermined intervals with sockets or recesses as 9 which denote and have located opposite each indicia 9ª setting forth the type sizes. These sockets are designed to receive yieldably mounted catch pins 10 carried by the lazytong structure or shuttle presently to be described. It is to be understood that these sockets are arranged in pairs, the sockets of each pair being disposed opposite in the forwardly projecting flanges of the guides 8. These pairs of sockets are to be positioned in the guides at predetermined intervals so that the pins 10 may be snapped into any desired pair according to the size of type it is desired to use.

Slidably mounted in column 3 between the guides 8 is a floating lazytong structure 21 pivoted at the top of column 3 at 21ª and composed of a plurality of cross bars 22, which are the only parts of the shuttle exposed. One hundred of these bars are employed in construcing the shuttle, each being numbered from 1 to 100 as shown in Fig. 1, and each cross bar is just five points wide. On linotype machines of today, the following sizes of type are usually employed, to wit:—5—5¼—6—7—8—9—10—11—12—and 14 point type, and these are the sizes that this gauge as shown is made to cover, it having been previously figured out just how many lines of various character type it took to fill an inch and the sockets marked to denote the type. For instance, ten pairs of sockets are employed and marked from five to fourteen as above described while the gauge here shown is intended for use in estimating on type from 5 to 14 point it is, of course, to be understood that it may be constructed for use with other size type, say for instance from 4 point to 20 point.

Each of the bars 22 is composed of two members 23 and 23' arranged one in front of the other and held spaced by sleeves 24 arranged between the ends thereof, and through which extend rivets 25. These cross bars are of uniform width and as above set forth are just five points wide.

Arranged between the members 23 and 23' of cross bars 22 are a plurality of levers or links 26, two of which intersect midway their ends at a point midway the length of each cross bar, and are there pivotally connected with each other and with said cross bar as shown at 27. The levers 26 each extends across three cross bars and they are connected at their ends as shown at 31 and being mounted between the sections of the bars are guided in their opening and closing movements thereby. By so constructing and arranging the levers and cross bars, said cross bars are held equal distances apart and in parallel relation at all times in the same manner that the uprights of an ordinary collapsible elevator door are held.

Depending from and slidable on the lowermost crossbar 22 are two arms 28 which carry the catch fingers 10, having beveled ends 30 and which are designed to engage the sockets in the guides when they register with said sockets to hold shuttle 21 in adjusted position. These fingers 10 have heads 29 at their inner or adjacent ends to facilitate their retraction. Coiled springs 10' connect arms 28 with lugs 10ª fixed on said lowermost cross bar 22, and these springs exert their tension to normally force the pins or fingers 10 toward the socket carrying portion of guides 8. There being one hundred of these cross bars 22, should the operator grasp the thumb members 29 and move the shuttle down fifty points, the result would be that a gap of one-half point would be opened up between each cross piece or bar and if the shuttle were pulled down one hundred points, the cross bars would open up just one point, the difference between five points and six points. Consequently, if it was desired to ascertain how many lines of nonpareil or six-point type was required to fill a space, of seven and five-sixteenths inches, the shuttle would be expanded or pulled down to bring the pins 10 to a point opposite the sockets marked six-point. Then, all that would be necessary to ascertain the desired amount or number of lines to be used would be for the operator to look at the number on the cross bar 22 which was disposed opposite the mark seven and five-sixteenths inches on the inch gauge, and this would give the answer. This procedure may be continued down the gauge as there is a pair of sockets for every size of type from five and one-half points to fourteen points, so that the operator can tell in about two seconds how many lines of any size type is required to fill any given space without aid of either paper or pencil or the necessity of calculating. This requirement may not only be ascertained in inches, since for instance, if the cut on which an estimate is to be given is marked one hundred and sixty agate lines deep, and it is desired to ascertain how many lines of type of seven-point would be required to fill this space, the same process is employed and the result may be ascertained at a glance by reading the number on the bar 22 which is disposed opposite the one-hundred and sixty agate line mark in the column headed "agate."

In the ordinary procedure, when a printer has a large advertisement to lay out, the size of the type to be used must be marked for the benefit of the linotype operator. Now, suppose a cut $8\frac{3}{16}$ inches deep was to be set in pearl or four and one-half point type, the first operation is to multiply eight and three-sixteenths by seventy-two, since there are seventy-two points to an inch, then as there are four and one-half points to a line of pearl type, the answer obtained by this multiplication is divided by four and one-half to obtain the number of lines of pearl type to be used. If the printer is rapid at figures, this operation will take him about one minute, more or less. By the use of this gauge the same result may be accomplished in about two seconds without necessitating any calculating on the part of the operator simply by grasping the members 29 and moving them toward each other against the tension of spring 10' and exerting a downward pull on the lazy tong structure until the pins 10 reach the socket 9 marked with the desired size of type to be used (in this instance $4\frac{1}{2}$ point). The pins will then snap into the sockets or holes 9 and a glance at the bar 22 of the shuttle which is opposite the marking on the inch scale (in this instance $8\frac{3}{16}''$) the number carried by bar 22 opposite the $8\frac{3}{16}''$ will indicate the number of lines of $4\frac{1}{2}$ point type required to fill a space $8\frac{3}{16}''$ deep.

The simplicity of this device is especially useful since there are so many men connected with the printing craft who are not familiar with the names of the different size of type, so that much confusion often results and many mistakes are made owing to this fact. Any person of ordinary intelligence can with this device, in about two seconds ascertain how many lines of any size type it will take to fill any given space.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A gauge of the class described comprising a fixed and a movable member, one having columns of indicia thereon and elements located at predetermined points, and the other having means for cooperation with said indicia and other means to co-operate with said points to determine quickly and accurately the number of lines of a selected type necessary to fill a space of known dimensions.

2. A gauge of the class described comprising a fixed and a movable member, one having columns of indicia thereon and sockets located at predetermined points, and the other having means for co-operation with said indicia, and pins to enter said sockets whereby the number of lines of a selected type necessary to fill a space of known dimensions may be quickly and accurately determined.

3. A gauge of the class described comprising a fixed and a movable member, one having columns of indicia thereon and sockets located at predetermined points, the other having means for co-operation with said indicia and being extensible and contractible and equipped with pins to enter said sockets whereby the number of lines of a selected type necessary to fill a space of known dimensions may be quickly and accurately determined.

4. A gauge of the class described comprising a plate having columns of indicia thereon, an expansible and contractible lazytong structure, and co-operating means carried by said plate and structure for determining automatically the number of lines of a selected type required to fill a space of known dimensions.

5. A gauge of the class described comprising a plate having columns of indicia marked thereon, an expansible and contractible lazytong structure mounted on said plate between two of said columns, spring pressed fingers carried by said structure, sockets carried by said plate located at predetermined intervals for the reception of said fingers to lock said structure in adjusted position, and co-operating means carried by said structure and plate to indicate at a glance the number of lines of a selected type required to fill a space of known dimensions.

In testimony whereof I affix my signature in presence of two witnesses.

CLOYDE H. SMITH.

Witnesses:
J. S. MILLER,
C. H. JOHNSON.